(12) United States Patent
Leonardi et al.

(10) Patent No.: US 11,901,769 B2
(45) Date of Patent: Feb. 13, 2024

(54) STATOR WITH PILOTING SUPPORTS

(71) Applicant: Ford Global Technologies, LLC, Dearborn, MI (US)

(72) Inventors: Franco Leonardi, Dearborn Heights, MI (US); Brian Christian Orr, Macomb, MI (US); Joel Hetrick, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/586,423

(22) Filed: Jan. 27, 2022

(65) Prior Publication Data

US 2023/0238839 A1 Jul. 27, 2023

(51) Int. Cl.
*H02K 1/18* (2006.01)
*H02K 3/32* (2006.01)

(52) U.S. Cl.
CPC .............. *H02K 1/185* (2013.01); *H02K 3/32* (2013.01)

(58) Field of Classification Search
CPC ................................. H02K 1/185; H02K 3/32
USPC ... 310/216.049, 51, 86, 87, 118, 119, 52–64
See application file for complete search history.

(56) References Cited

U.S. PATENT DOCUMENTS

| | | | | | |
|---|---|---|---|---|---|
| 996,927 | A * | 7/1911 | Ihlder | ...................... | H02K 1/20 310/64 |
| 1,882,487 | A * | 10/1932 | Dupont | .................... | H02K 9/06 310/216.011 |
| 2,151,561 | A * | 3/1939 | Morrill | ................... | H02K 1/185 310/216.049 |
| 2,253,191 | A * | 8/1941 | Morrill | ................... | H02K 1/146 310/216.049 |
| 2,774,001 | A * | 12/1956 | Riedel | ...................... | H02K 1/16 310/216.049 |
| 2,818,515 | A * | 12/1957 | Dolenc | .................. | H02K 1/185 310/216.049 |
| 3,382,573 | A * | 5/1968 | Mantelet | ................ | H02K 1/146 29/598 |
| 3,436,579 | A * | 4/1969 | Elgar | ....................... | H02K 9/00 310/60 R |
| 3,465,188 | A * | 9/1969 | Sisk | ......................... | H02K 1/16 310/216.049 |

(Continued)

FOREIGN PATENT DOCUMENTS

| DE | 102019127055 A1 * | 4/2020 | ............... H02K 1/12 |
|---|---|---|---|
| GB | 2281664 A * | 3/1995 | ......... B66B 11/0407 |

(Continued)

OTHER PUBLICATIONS

GB-2281664-A, all pages (Year: 1995).*
DE-102019127055-A1, all pages (Year: 2020).*
WO-2005053139-A1, all pages (Year: 2005).*

*Primary Examiner* — Naishadh N Desai
(74) *Attorney, Agent, or Firm* — David B. Kelley; Brooks Kushman P.C.

(57) ABSTRACT

A stator includes a plurality of same laminations each defining a piloting tab on a perimeter thereof, and stacked to form a stator body and such that the piloting tabs define at least two axially extending serrated edge portions spaced apart from one another around a perimeter of the stator body or at least two sets of axially aligned housing contact pads spaced apart from one another around the perimeter.

7 Claims, 5 Drawing Sheets

(56) References Cited

U.S. PATENT DOCUMENTS

| | | | | | |
|---|---|---|---|---|---|
| 5,173,629 | A | * | 12/1992 | Peters | H02K 1/20 |
| | | | | | 310/58 |
| 5,218,252 | A | * | 6/1993 | Iseman | H02K 1/185 |
| | | | | | 310/216.049 |
| 5,491,371 | A | * | 2/1996 | Ooi | H02K 1/32 |
| | | | | | 310/58 |
| 5,799,387 | A | * | 9/1998 | Neuenschwander | B21D 35/00 |
| | | | | | 29/598 |
| 5,929,545 | A | * | 7/1999 | Fargo | H02K 5/15 |
| | | | | | 310/260 |
| 5,982,071 | A | * | 11/1999 | Ehrick | H02K 1/30 |
| | | | | | 310/227 |
| 6,000,119 | A | * | 12/1999 | Neuenschwander | B21D 28/02 |
| | | | | | 310/216.049 |
| 6,072,253 | A | | 6/2000 | Harpenau et al. | |
| 7,633,194 | B2 | * | 12/2009 | Dawsey | B60L 3/0061 |
| | | | | | 310/64 |
| 8,053,938 | B2 | * | 11/2011 | Pal | H02K 1/20 |
| | | | | | 310/58 |
| 8,427,018 | B2 | * | 4/2013 | Dutau | H02K 1/20 |
| | | | | | 310/58 |
| 2002/0047463 | A1 | * | 4/2002 | Neuenschwander | |
| | | | | | H02K 15/024 |
| | | | | | 310/216.049 |
| 2010/0277030 | A1 | * | 11/2010 | Allen | H02K 19/38 |
| | | | | | 310/216.049 |
| 2012/0181881 | A1 | | 7/2012 | Jones et al. | |

FOREIGN PATENT DOCUMENTS

| | | | | |
|---|---|---|---|---|
| JP | 3774862 B2 | 5/2006 | | |
| WO | WO-2005053139 A1 | * | 6/2005 | H02K 11/21 |

* cited by examiner

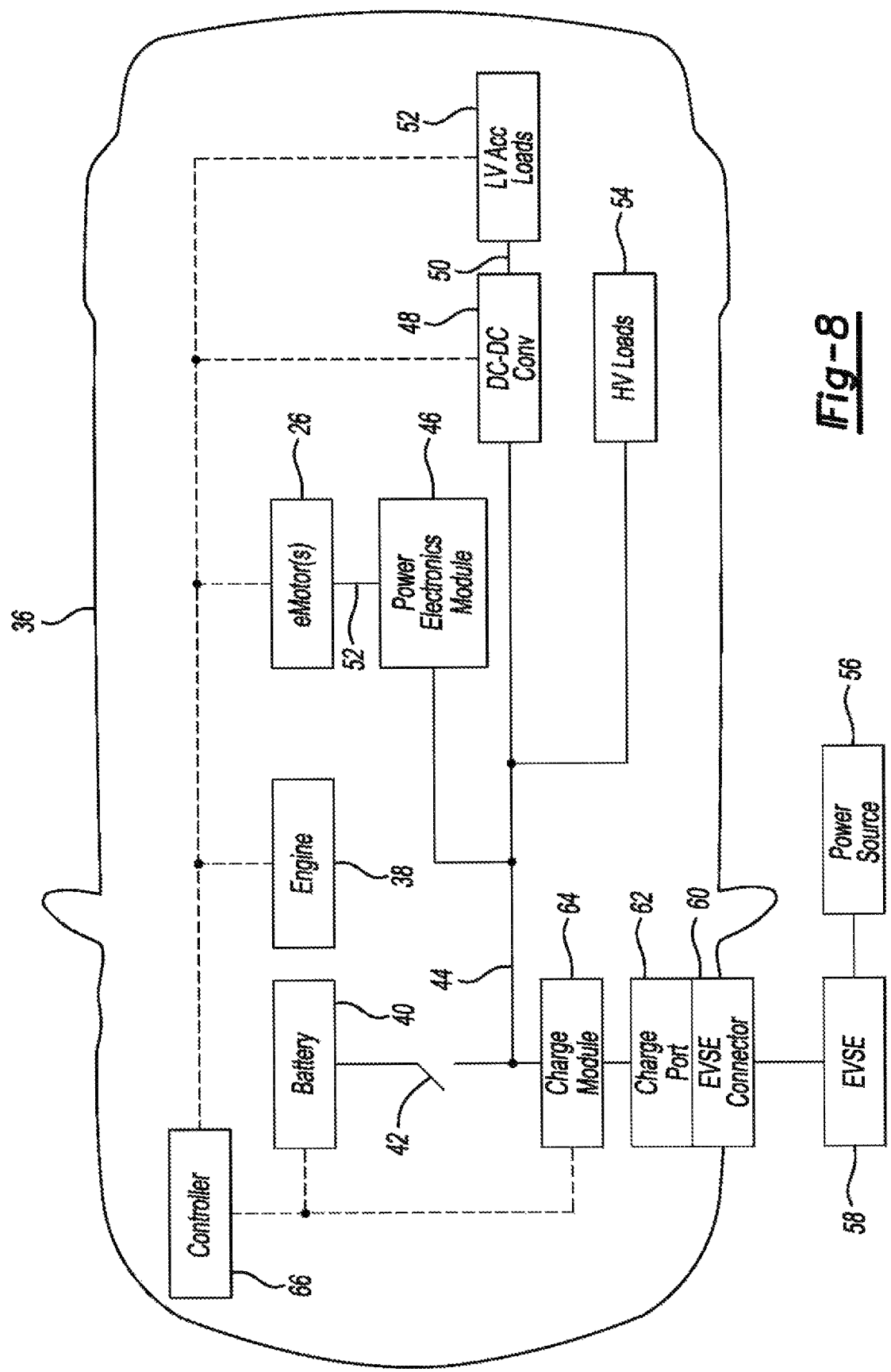

US 11,901,769 B2

STATOR WITH PILOTING SUPPORTS

TECHNICAL FIELD

The present disclosure relates to systems and methods of manufacturing a stator core.

BACKGROUND

Many vehicles employ electric machines for propulsion. Some electric machines are motors comprised of stators, rotors, etc. In such electric machines, the stators may be comprised of many stator laminations, stacked together to define stator cores.

SUMMARY

An electric machine includes a housing and a plurality of same laminations. Each of the laminations defines a piloting tab on a perimeter thereof. The laminations are stacked to form a stator having a body disposed within the housing and such that the piloting tabs define at least two axially extending serrated edge portions spaced apart from one another around a perimeter of the stator and that contact the housing and space the body away from the housing.

A stator includes a plurality of same laminations each defining at least one piloting tab on a perimeter thereof, and stacked to form a stator body and such that the piloting tabs define at least two sets of axially aligned housing contact pads radially spaced apart from one another around a perimeter of the stator body. The housing contact pads of the sets axially alternate along the stator.

A stator includes a plurality of same laminations each defining a piloting tab on a perimeter thereof, and stacked to form a stator body and such that the piloting tabs define at least two axially extending serrated edge portions spaced apart from one another around a perimeter of the stator body and at least two sets of axially aligned housing contact pads spaced apart from one another around the perimeter.

BRIEF DESCRIPTION OF THE DRAWINGS

FIG. 8 is block diagram of a vehicle.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Creating an oil film around an electric machine stator may be beneficial for heat removal, especially in machines with relatively long axial length compared to diameter. This may pose issues with maintaining proper concentricity between the stator and the housing. Piloting the stator on both ends may causes excessive machining operations on the housings. Piloting on one end requires a large area dedicated to the pilot where oil may not reach the stator.

A typical housing has a uniform inner diameter with no features dedicated to piloting the stator. A series of tabs can thus be added to the lamination outer profile to provide the piloting function. The tabs may be located near a subset of mounting ears of the lamination to avoid an increase in steel consumption.

Figure 1:
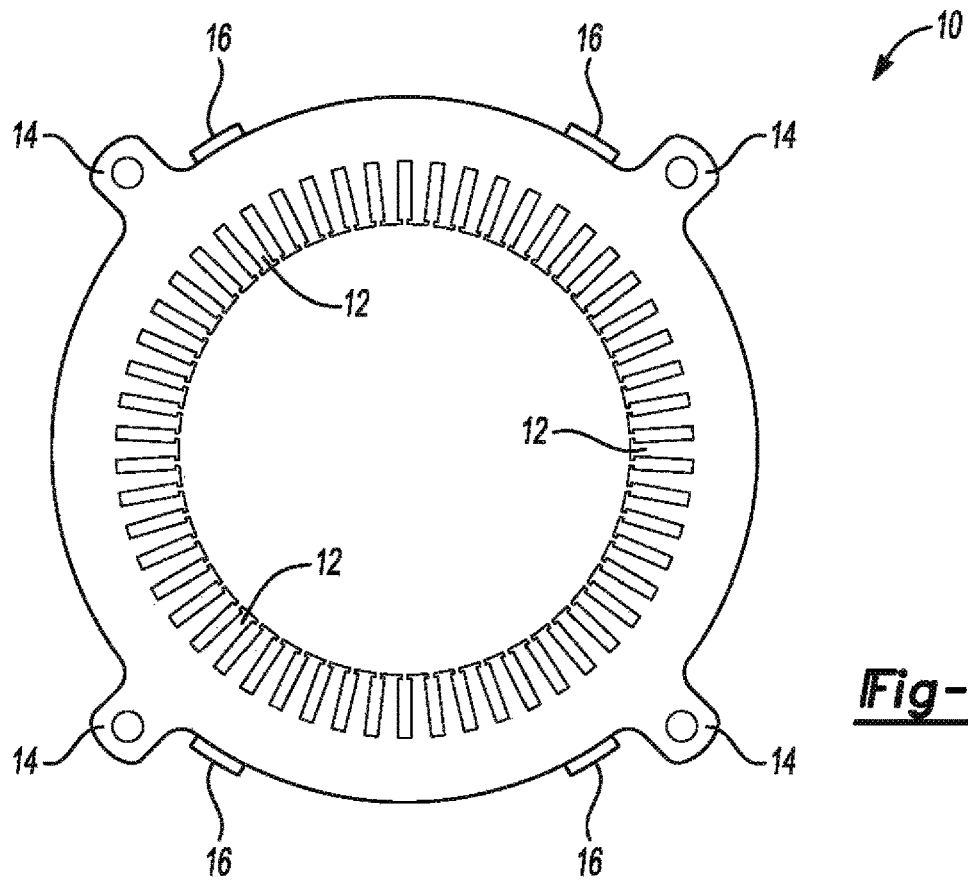
FIG. 1 is a plan view of a stator lamination.

Referring to FIG. 1, a stator lamination 10 defines a plurality of teeth 12 around an inner surface thereof and a plurality of mounting ears 14 (spaced 90° apart) and piloting tabs 16 around an outer surface (or perimeter) thereof. In this example, the piloting tabs 16 are placed on opposite sides of the lamination 10, each near one of the mounting ears 14. In other examples, a fewer or greater number of piloting tabs 16 may be used (e.g., one, three, five, etc.), and their locations may be different. A pair of piloting tabs, for example, may be located on opposite sides of a lamination. Likewise, a fewer number of mounting ears 14 may be used (e.g., three spaced 120° apart, zero, etc.). Although piloting tab widths may vary depending on design, the widths shown are roughly equal to or less than the widths of the mounting ears 14.

Figure 2:
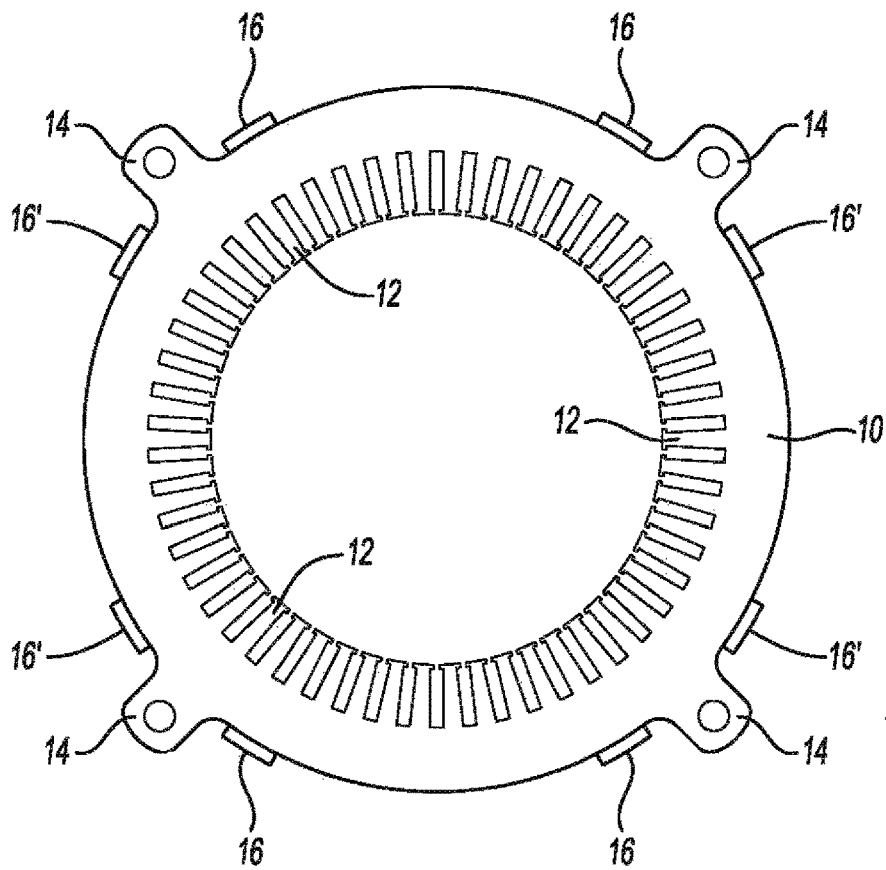
FIG. 2 is a plan view of a pair of the stator laminations of FIG. 1.

Referring to FIG. 2, a pair of the stator laminations 10 have been stacked together and rotated 90° relative to one another. The top stator lamination 10 is in the same position as in FIG. 1. The bottom stator lamination has been rotated 90° relative to that position. Thus, the piloting tabs 16' of the bottom stator lamination 10 are visible. Various surfaces for contacting a housing can be formed depending on how the stator laminations 10 are rotated and positioned when stacked.

It is standard practice to rotate laminations during stator core assembly to obtain good mechanical properties (e.g., squareness, perpendicularity, concentricity) of the core itself. The amount of rotation depends on the number of mounting ears (e.g., 90°, 180°, or 270° for a four ear stator, 120° or 240° for a three ear stator). If ears are not used to mount the stator, the rotation angle is determined by a multiple of the stator tooth pitch. For a stator with forty-eight teeth, the tooth pitch is 360°/48=7.5°). With such a fine rotation, it is possible to create a variety of arrangements of piloting tabs along the outer surface of the stator.

Figure 3:
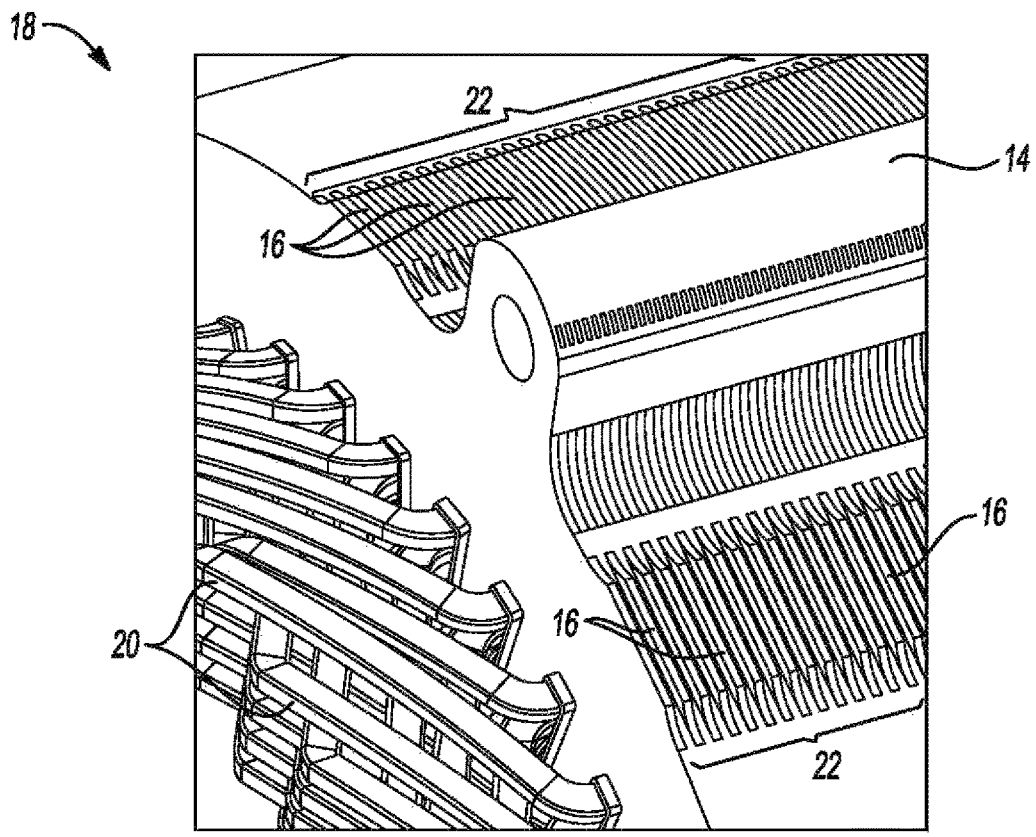
FIG. 3 is a perspective view of a portion of a stator.

Referring to FIG. 3, a plurality of the stator laminations has been stacked to form a stator core 18. The teeth 12 have been wound with wires 20 in the usual fashion. Rotation of each of the stator laminations 10 by 90° with respect to the previous stator lamination 10 has resulted in the piloting tabs 16 forming a pair of axially extending serrated edge portions 22 on each side of each of the mounting ears 14. In such an arrangement, any one of the axially extending serrated edge portions 22 is thus spaced 90°, 180°, or 270° away from another of the axially extending serrated edge portions. Within the context of a stator including only three mounting ears, any one of the axially extending serrated edge portions would be spaced 120° or 240° away from another of the axially extending serrated edge portions. Within the context of a stator that does not have any mounting ears, any one of the axially extending serrated edge portions would be spaced away from another of the axially extending serrated edge portions at an angle that is a multiple of the tooth pitch.

Figure 4:
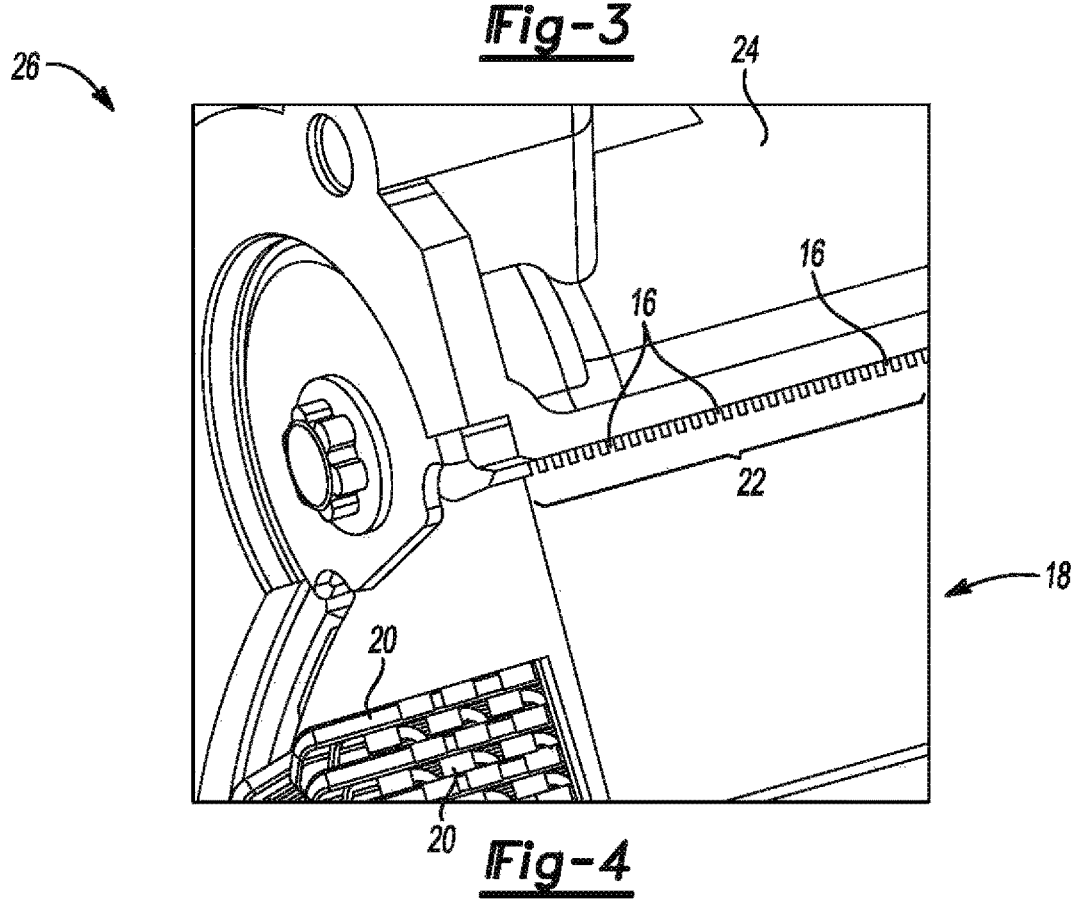
FIG. 4 is perspective view of a portion of an electric machine.

Referring to FIG. 4, the outer surfaces defined by the axially extending serrated edge portions 22 are the only parts of the stator laminations 10 that can contact an inner wall of the housing 24. The piloting features therefore allow the flow of coolant along the stator outer surface and increase the contact surface between coolant and the stator core 18 to improve heat exchange within electric machine 26.

Figure 5:
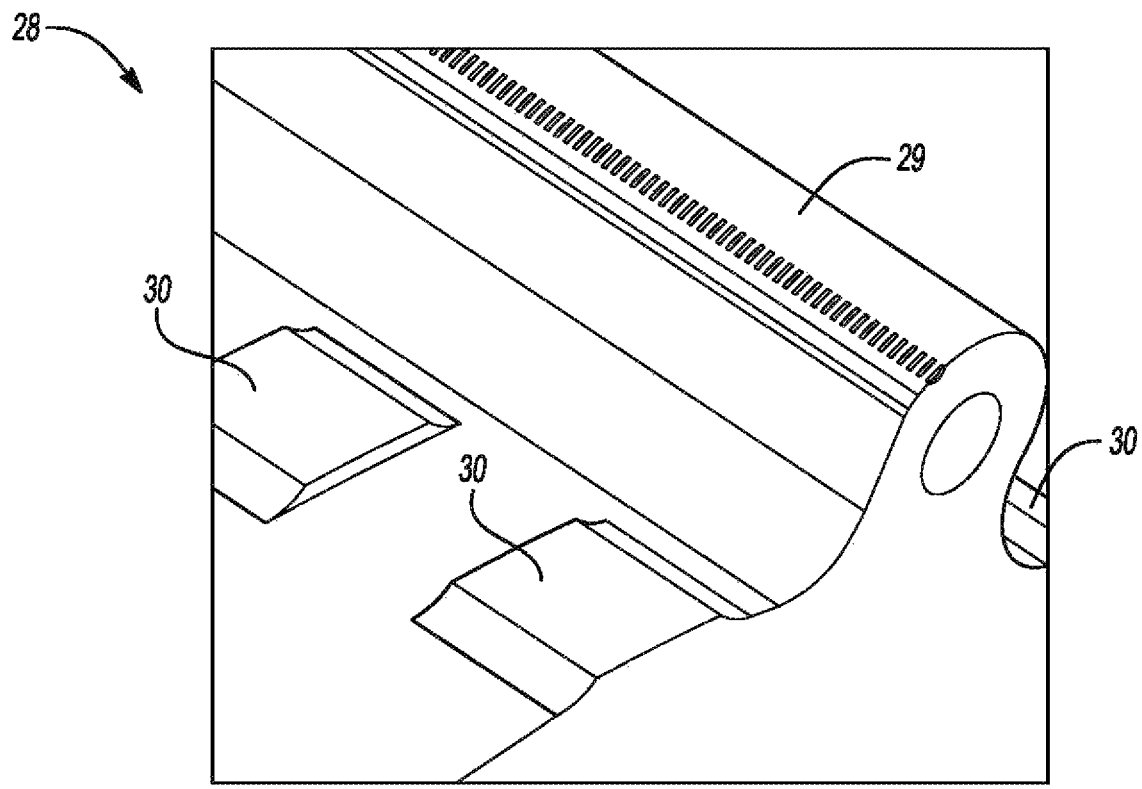
FIG. 5 is a perspective view of a portion of a stator core.
Figure 6:
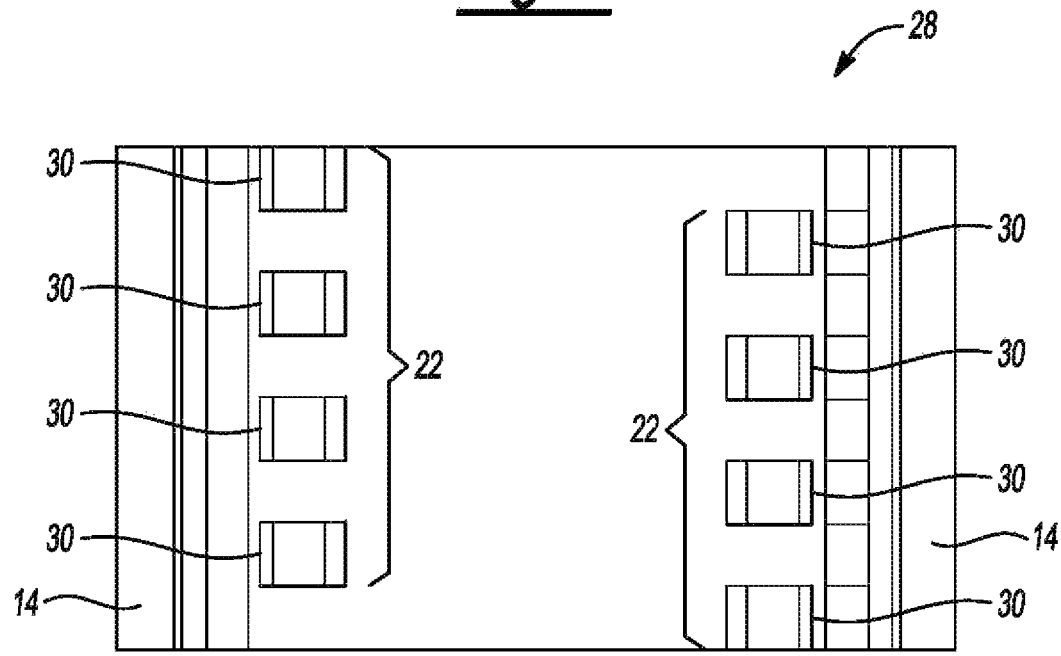
FIG. 6 is a side view of the stator core of FIG. 5.

Referring to FIGS. 5 and 6, varying the rotation of each lamination and/or positioning the piloting tabs on either side of mounting ears 29 can form different contact pads on the stator perimeter as mentioned above. Referring to FIGS. 5 and 6, a plurality of stator laminations has been stacked to form a stator core 28. Each of a first group of the stator laminations is rotated by 0° (i.e., no rotation) or 180° with respect to adjacent stator laminations of the first group. This results in the first group of the stator laminations having the piloting tabs in the same position creating a large contact pad 30. Each of a next group of the stator laminations is alternately rotated by 90° or 270° relative to the first group, creating a second contact pad 30 at 90° rotation from the first contact pad 30 (120° or 240° for three mounting ear configurations, at a rotational angle that is a multiple of the tooth pitch, etc.). This is repeated throughout the length of the stator core 28. The stator core 28, in this example, thus has sets 32 of the contact pads 30 axially aligned and radially spaced apart from one another around a perimeter of the stator core 28. As apparent from FIG. 6, the contact pads 30 of the sets 32 axially alternate along the stator core 28.

Figure 7:
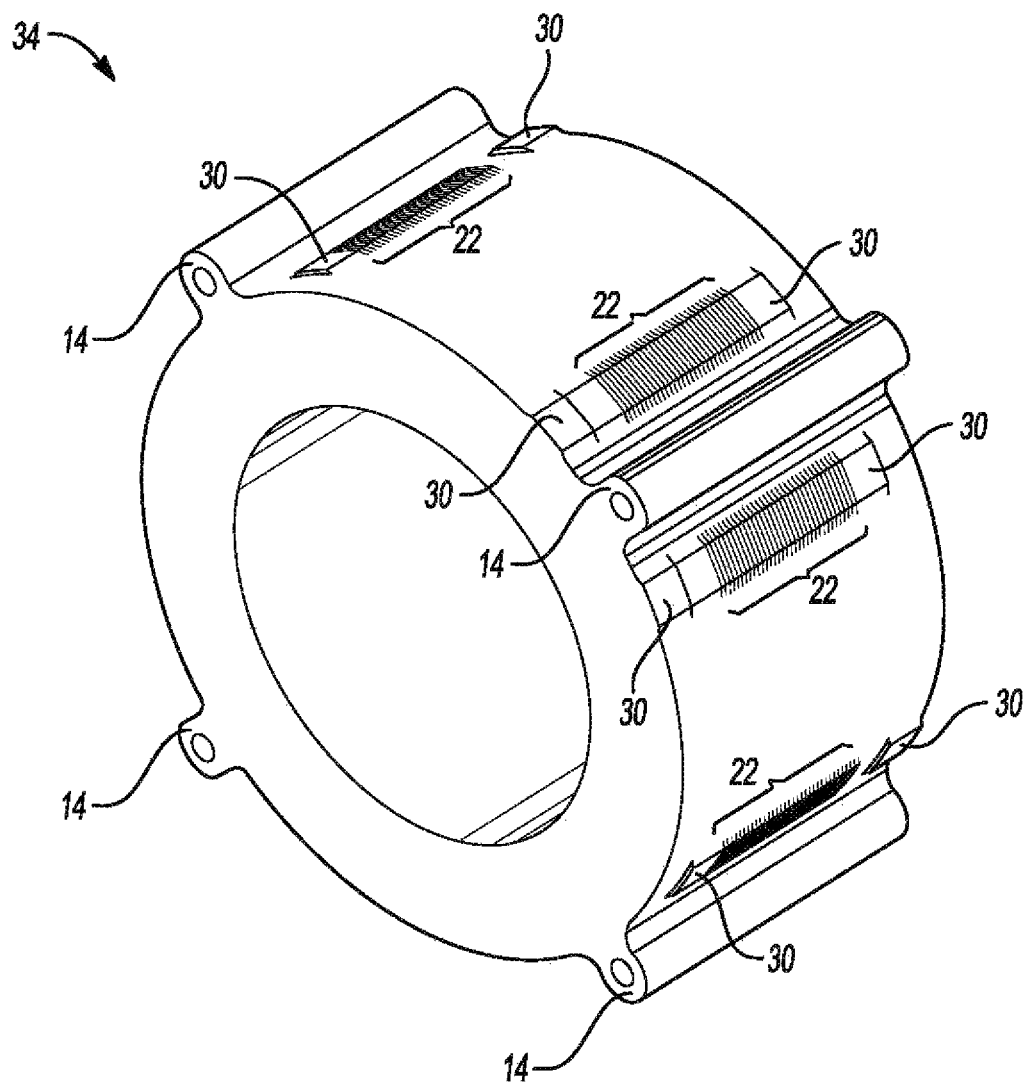
FIG. 7 is a perspective view of a stator core.

Referring to FIG. 7, a plurality of stator laminations has been stacked to form a stator core 34. The rotational schemes described above have been combined such that the piloting tabs form axially extending serrated edge portions 22 and contact pads 30. Other arrangements are also possible.

The electric machine 26 or other electric machines contemplated herein may be used within the context of an automotive vehicle. Referring to FIG. 8, a hybrid-electric vehicle 36 includes an electrified propulsion system having one or more of the electric machines 26 mechanically coupled to a hybrid transmission (not shown). The electric machines 26 may be capable of operating as a motor or a generator. In addition, the hybrid transmission is mechanically coupled to an internal combustion engine 38. The electric machines 26 are arranged to provide propulsion torque as well as slowing torque capability either while the engine 38 is operated or turned off. The electric machines 26 are capable of operating as generators to provide fuel economy benefits by recovering energy that would normally be lost as heat in a friction braking system. The electric machines 26 may additionally impart a reaction torque against the engine output torque to generate electricity for recharging a traction battery 40 while the vehicle 36 is operating. The electric machines 26 may further reduce vehicle emissions by allowing the engine 38 to operate near the most efficient speed and torque ranges. When the engine 38 is off, the vehicle 36 may be operated in an electric-only drive mode using the electric machines 26 as the sole source of propulsion. The hybrid transmission is also mechanically coupled to road wheels to output torque from the electric machines 26 and/or combustion engine 40.

The traction battery or battery pack 40 stores energy that can be used to power the electric machines 26. The battery pack 40 provides a high-voltage direct current (DC) output. One or more contactors 42 may isolate the traction battery 40 from a DC high-voltage bus 44 when opened and couple the traction battery 40 to the DC high-voltage bus 40 when closed. The traction battery 40 is electrically coupled to one or more power electronics modules 46 via the DC high-voltage bus 44. The power electronics module 46 is also electrically coupled to the electric machines 26 and provides the ability to bi-directionally transfer energy between an alternating current (AC) high-voltage bus and the electric machines 26. In some examples, the traction battery 40 may provide DC while the electric machines 26 operate using three-phase AC. The power electronics module 46 may convert the DC to three-phase AC to operate the electric machines 26. In regenerative mode, the power electronics module 46 may convert the three-phase AC current output from the electric machines 26 acting as generators to DC compatible with the traction battery 40. The description herein is equally applicable to an all-electric vehicle without a combustion engine.

In addition to providing energy for propulsion, the traction battery 40 may provide energy for other vehicle electrical systems. The vehicle 36 may include a DC/DC converter module 48 that is electrically coupled to the high-voltage bus 44. The DC/DC converter module 48 may be electrically coupled to a low-voltage bus 50. The DC/DC converter module 48 may convert the high-voltage DC output of the traction battery 40 to a low-voltage DC supply that is compatible with low-voltage vehicle loads 52. High-voltage loads 54 are also electrically coupled to the high-voltage bus 44.

The traction battery 40 may be recharged by an off-board power source 56, which may be a connection to an electrical outlet. The external power source 56 may be electrically coupled to a charger or another type of electric vehicle supply equipment (EVSE) 58. The off-board power source 56 may be an electrical power distribution network or grid as provided by an electric utility company. The EVSE 58 provides circuitry and controls to manage the transfer of energy between the power source 56 and the vehicle 36. The off-board power source 56 may provide DC or AC electric power to the EVSE 58. The EVSE 58 is outfitted with a connector 60 that mates with a charge port 62 of the vehicle 36. The charge port 62 is electrically coupled with a charge module 64 that can be electrically coupled with the traction battery 40 via the one or more contactors 42.

The various components discussed may have one or more associated controllers to control, monitor, and coordinate the operation of the components. The controllers may communicate via a serial bus (e.g., Controller Area Network (CAN)) or via discrete conductors. In addition, a vehicle system controller 66 may be provided to coordinate the operation of the various components While exemplary embodiments are described above, it is not intended that these embodiments describe all possible forms encompassed by the claims. The words used in the specification are words of description rather than limitation, and it is understood that various changes may be made without departing from the spirit and scope of the disclosure.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An electric machine comprising:
   a housing; and
   a plurality of same laminations each defining a piloting tab on a perimeter thereof, and stacked to form a stator having a body disposed within the housing and such that the piloting tabs define at least two axially extending serrated edge portions, each defined by alternating presence and absence of the piloting tabs, spaced apart from one another around a perimeter of the stator and configured to contact the housing and space the body away from the housing.

2. The electric machine of claim 1, wherein each of the laminations further defines a mounting ear on a perimeter thereof and wherein the piloting tab is adjacent to the mounting ear.

3. The electric machine of claim 2, wherein the mounting ear extends radially away from the body more than the at least one piloting tab.

4. The electric machine of claim 1, wherein the serrated edge portions are spaced 90°, 180°, or 270° apart.

5. The electric machine of claim 1, wherein the serrated edge portions are spaced 120° or 240° apart.

6. The electric machine of claim 1, wherein the stator has a tooth pitch and wherein the serrated edge portions are spaced apart at a rotational angle that is a multiple of the tooth pitch.

7. The electric machine of claim 1, wherein the piloting tabs further define at least one housing contact pad.

* * * * *